United States Patent
Kojima (10) Patent No.: US 8,410,912 B2
(45) Date of Patent: Apr. 2, 2013

(54) PRINTING DEVICE

(75) Inventor: Hiromasa Kojima, Tokyo (JP)

(73) Assignees: Kabushiki Kaisha Sato (JP); Kabushiki Kaisha Sato Chishiki Zaisan Kenkyusyo (JP)

(*) Notice: Subject to any disclaimer, the term of this patent is extended or adjusted under 35 U.S.C. 154(b) by 536 days.

(21) Appl. No.: 12/740,730

(22) PCT Filed: Jul. 7, 2008

(86) PCT No.: PCT/JP2008/062267
§ 371 (c)(1),
(2), (4) Date: Apr. 30, 2010

(87) PCT Pub. No.: WO2009/057352
PCT Pub. Date: May 7, 2009

(65) Prior Publication Data
US 2010/0245058 A1    Sep. 30, 2010

(30) Foreign Application Priority Data
Oct. 31, 2007    (JP) ................. 2007-283778

(51) Int. Cl.
*G08B 13/14* (2006.01)
*H04Q 5/22* (2006.01)
*G06F 17/00* (2006.01)

(52) U.S. Cl. ............... 340/10.52; 340/572.1; 340/10.5; 235/375

(58) Field of Classification Search .......... 340/10, 340/572; 235/375–385, 472.02, 487; 400/76; 358/1.15
See application file for complete search history.

(56) References Cited

U.S. PATENT DOCUMENTS

| | | | |
|---|---|---|---|
| 7,111,782 B2* | 9/2006 | Homewood et al. | 235/386 |
| 7,360,714 B2* | 4/2008 | Sano et al. | 235/492 |
| 7,439,858 B2* | 10/2008 | Feltz et al. | 340/572.1 |
| 7,623,038 B2* | 11/2009 | Neuhard | 340/572.1 |
| 7,876,223 B2* | 1/2011 | Yamaguchi et al. | 340/572.1 |
| 7,994,917 B2* | 8/2011 | Hirota et al. | 340/572.1 |

(Continued)

FOREIGN PATENT DOCUMENTS

JP    09-254498 A    9/1997
JP    2003-288557 A    10/2003

(Continued)

OTHER PUBLICATIONS

International Search Report dated Aug. 5, 2008, issued in corresponding international application No. PCT/JP2008/062267.

*Primary Examiner* — Daniel Wu
*Assistant Examiner* — Mohamed Barakat
(74) *Attorney, Agent, or Firm* — Ostrolenk Faber LLP (57) ABSTRACT

A printing device capable of detecting an error type, that is, at which step in a printing process an error has occurred and capable of performing a simplified procedure for identifying the cause of the error. The printing device includes a reader/writer for writing information into an RFID tag and for detecting errors at a plurality of steps in a procedure for writing the information into the RFID tag and a ROM for storing each of the error patterns at respective steps at which errors have been detected by the reader/writer. When an error is detected by the reader/writer, a control unit reads, from the ROM, one of the error patterns corresponding to a step at which the error has been detected and prints the detected error on an RFID label.

13 Claims, 6 Drawing Sheets

U.S. PATENT DOCUMENTS

| | | |
|---|---|---|
| 8,020,774 B2 * | 9/2011 | Ohashi et al. ................. 235/492 |
| 8,217,758 B2 * | 7/2012 | Maruo et al. ................. 340/10.1 |
| 2005/0120260 A1 * | 6/2005 | Suzuki et al. ..................... 714/5 |
| 2007/0014615 A1 * | 1/2007 | Kasayama et al. ............. 400/76 |

FOREIGN PATENT DOCUMENTS

| | | |
|---|---|---|
| JP | 2005-103891 A | 4/2005 |
| JP | 2006-88705 | 4/2006 |
| JP | 2009-015145 | 1/2009 |

* cited by examiner

| total number of printed sheets | 1269 |
|---|---|
| number of read error sheets | 1 |
| number of write error sheets | 2 |
| number of verified error sheets | 3 |
| total number of error sheets | 6 |

(b)

| total number of printed sheets | 1325→1326 |
|---|---|
| number of read error sheets | 1→2 |
| number of write error sheets | 2 |
| number of verified error sheets | 3 |
| total number of error sheets | 6→7 |

(c)

| total number of printed sheets | 1434→1435 |
|---|---|
| number of read error sheets | 2 |
| number of write error sheets | 2→3 |
| number of verified error sheets | 3 |
| total number of error sheets | 7→8 |

(d)

| total number of printed sheets | 1697→1698 |
|---|---|
| number of read error sheets | 2 |
| number of write error sheets | 3 |
| number of verified error sheets | 3→4 |
| total number of error sheets | 8→9 |

PRINTING DEVICE

CROSS REFERENCE TO RELATED APPLICATION

The present application is a 35 U.S.C. §§371 national phase conversion of PCT/JP2008/062267, filed Jul. 7, 2008, which claims priority of Japanese Patent Application No. 2007-283778, filed Oct. 31, 2007, the content of which is incorporated herein by reference. The PCT International Application was published in the Japanese language.

TECHNICAL FIELD

The present invention relates to a printing device for writing information into and performing printing onto RFID (Radio Frequency Identification) sheet such as labels having RFID tags and product information tags. More particularly, the present invention relates to a printing device which prints error type patterns at occurrence of errors in communication with RFID tags.

BACKGROUND ART

In recent years, with the spread of IC (integrated circuit) chips and RFID (Radio Frequency Identification) tags, each comprising an antenna connected to the IC chip, merchandise control is performed by attaching RFID sheets such as labels and merchandise tags having RFID tags to articles. On the RFID sheet, printing is performed by using a printing device capable of writing article information, etc. into the RFID tag. However, IC chips of RFID tags are vulnerable to shocks such as the static electricity, and may be damaged during the manufacturing process or before usage. Therefore, there is a possibility of a tag being unusable. Therefore, in case of failure in writing into an RFID tag, the RFID sheet with the unusable RFID tag is distinguished from the other normal RFID sheet by printing an error pattern on the RFID sheet (for example, see Japanese Unexamined Patent Application, First Publication No. 2006-88705).

SUMMARY OF INVENTION

Technical Problem

When the printing device communicates with the RFID tag and writes information into the RFID tag, a process of reading information from the RFID tag, a process of writing information into the RFID tag, and a process of verifying written information in the RFID tag are being performed. However, with the conventional technology, it is only possible to distinguish the RFID sheet with the unusable RFID tag, but it is not possible to identify the type of error caused, that is, at which step the error has occurred. To clarify the cause of the error, it is necessary to communicate with the RFID tag again by using the reader/writer, etc., which takes much time and effort for finding the cause of the error.

Solution to Problem

Accordingly, the present invention has been made in view of the aforementioned problem. It is an object of the present invention to provide a printing device which can easily identify the type of error caused, that is, at which step the error has occurred, saving time and effort for finding the cause of the error.

In order to solve the aforementioned problems, a printing device of the present invention proposes the following arrangements.

An aspect of the present invention relates to a printing device which writes information into and prints on a RFID sheet having a RFID tag. The printing device comprises: an information writing unit which writes information into the RFID tag; an error detection unit which detects errors at a plurality of steps in a procedure for writing information into the RFID tag by the information writing unit; an error type pattern storage unit which stores each of error type patterns at respective steps at which the errors have been detected by the error detection unit; and a printing control unit which reads the error type patterns corresponding to a step at which the error has been detected, from the error type pattern storage unit when an error is detected by the error detection unit, and which prints the error type pattern on the RFID sheet.

Another aspect the present invention relates to the printing device further comprising an error information storage unit which stores the number of error sheets for respective steps, the sheets increased by one each time an error is detected by the error detection unit, as an error information.

Another aspect the present invention relates to the printing device wherein when an error is detected by the error detection unit, the printing control unit prints the number of error sheets corresponding to the step at which the error was detected on the RFID sheet.

Another aspect the present invention relates to the printing device wherein, together with the number of error sheets, the printing device stores the total number of printed sheets increased by one each time printing is performed on the RFID sheet as the error information in the error information storage unit, and wherein the printing control unit prints the total number of printed sheets on the RFID sheet when an error is detected by the error detection unit.

Another aspect the present invention relates to the printing device further comprising an input unit which resets the error information stored in the error information storage unit.

Advantageous Effects of Invention

The printing device of the present invention comprises an information writing unit which writes information into the RFID tag; an error detection unit which detects errors at a plurality of steps in a procedure for writing information into the RFID tag by the information writing unit, and an error type pattern storage unit which stores each of the error type patterns at respective steps at which the errors have been detected by the error detection unit. When an error is detected by the error detection unit, the printing device is configured to read the error type pattern corresponding to the step at which the error has been detected, from the error type pattern storage unit. The error type pattern, corresponding to the step at which the error has been detected by the error detection unit, is printed on the RFID sheet of which the RFID tag is unusable. Therefore, it is possible to easily understand the type of error caused, that is, at which step the error had occurred, saving time and effort for finding the cause of the error.

Furthermore, the printing device of the present invention comprises an error information storage unit which stores the number of error sheets increased by one each time an error is detected by the error detection unit for the respective steps as an error information. Therefore, by referring to the number of error sheets stored in the error information storage unit, it is possible to easily understand the number of error sheets that occurred at each step, saving time and effort for finding the cause of the error.

Still further, the printing device of the present invention is configured to print on the RFID sheet the number of error sheets corresponding to the step at which the error was detected, when an error is detected by the error detection unit. Therefore, it is possible to easily understand the number of errors that occurred at each step simply by looking at the issued RFID sheet, saving time and effort for finding the cause of the error.

Furthermore, the printing device of the present invention is configured to store, together with the number of error sheets, the total number of printed sheets increased by one each time printing is performed on the RFID sheet as the error information in the error information storage unit. When an error is detected by the error detection unit, the printing device is configured to print the total number of printed sheets on the RFID sheet. Therefore, based on the total number of sheets printed and the total number of error sheets printed on the RFID sheet, it is possible to easily identify the frequency of error occurrence against the total number of sheets printed, saving time and effort for finding the cause of the error.

Still further, the printing device of the present invention comprises an input unit which resets the error information stored in the error information storage unit. Therefore, by resetting the error information stored in the error information storage unit, for each sheet type or production lot of the loaded RFID sheet, it is possible to easily understand the error frequency for each sheet type or production lot of the RFID sheet, saving time and effort for finding the cause of the error.

BRIEF DESCRIPTION OF DRAWINGS

FIG. 2(*a*) is a schematic view showing a form of a continuous label strip used in the embodiment of the printing device of the present invention.

FIG. 2(*b*) is a cross-section through the continuous label strip used in the embodiment of the printing device of the present invention along the dash line A-A' in FIG. 2(*a*).

FIG. 4(*a*)-(*d*) each is a diagram showing an example of the error information stored in the error information storage unit shown in FIG. 3.

FIG. 6(*a*) shows an example of an RFID label issued with an error type pattern and error information in the embodiment of the printing device of the present invention.

FIG. 6(*b*) shows an example of an RFID label issued with an error type pattern and error information in the embodiment of the printing device of the present invention.

FIG. 6(*c*) shows an example of an RFID label issued with an error type pattern and error information in the embodiment of the printing device of the present invention.

DESCRIPTION OF EMBODIMENTS

Detailed description will be made below regarding an embodiment of the present invention with reference to the drawings.

Figure 1:
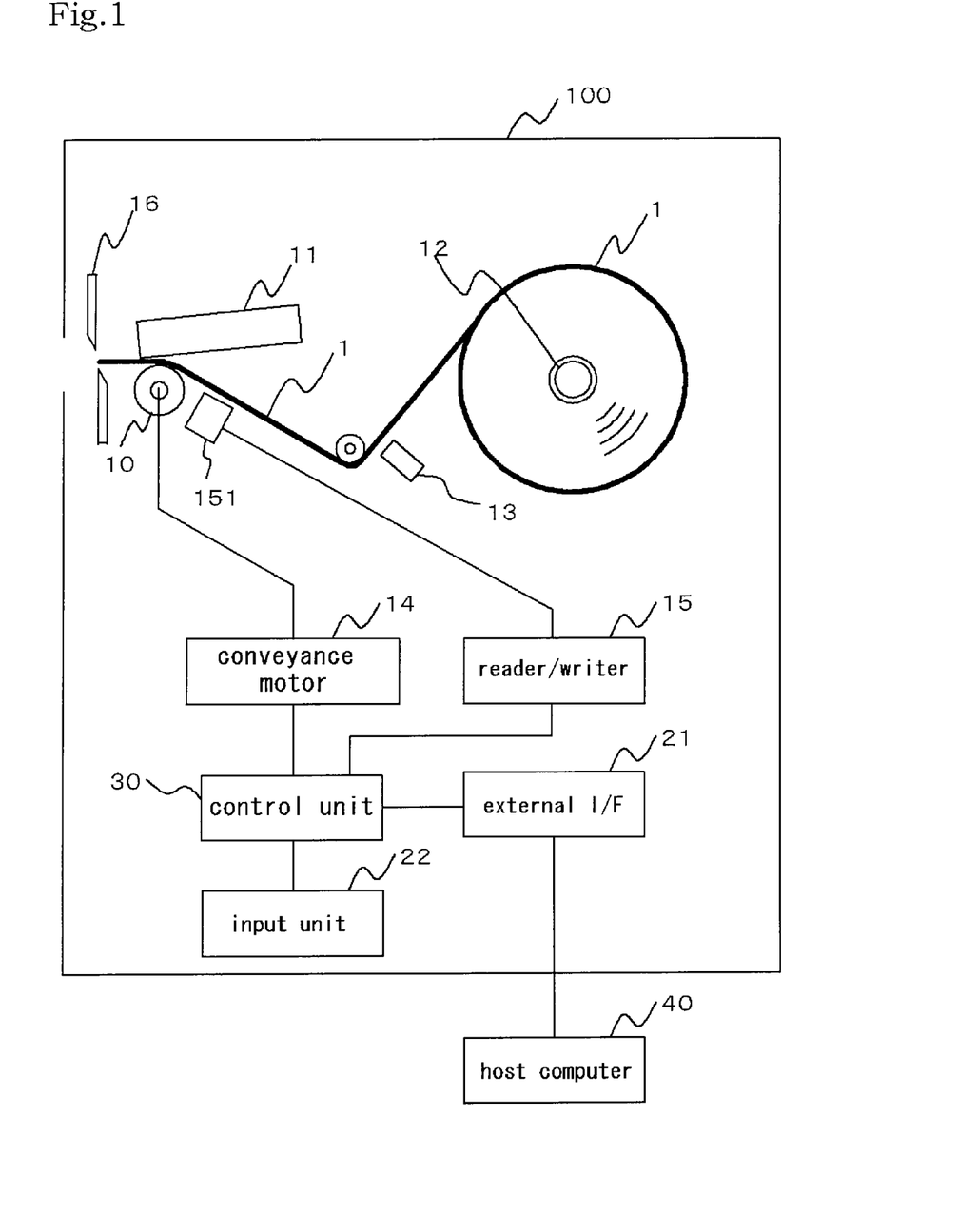
FIG. 1 is a block diagram of the printing device showing an embodiment of the present invention.
Figure 2:
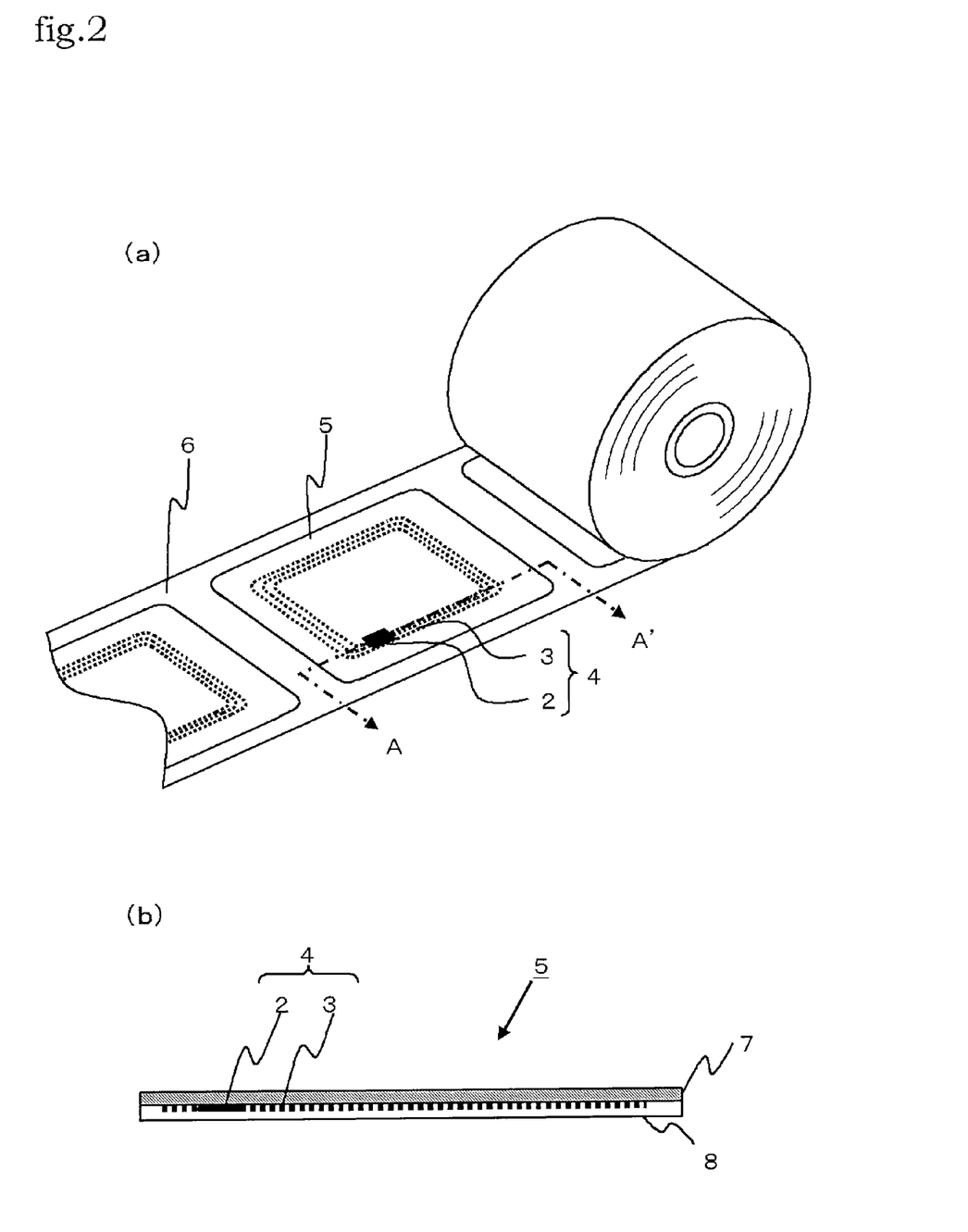
Figure 3:
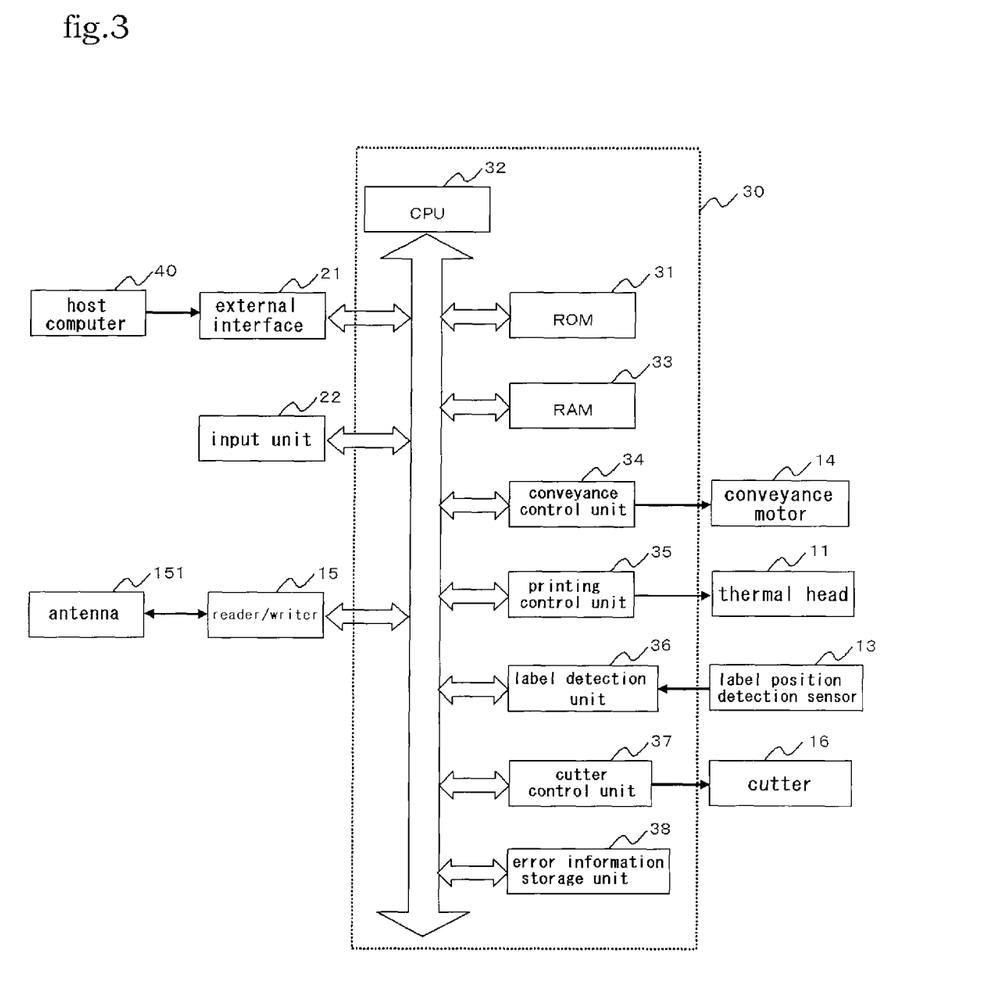
FIG. 3 is a block diagram of the configuration of the control unit shown in FIG. 1.
Figure 4:
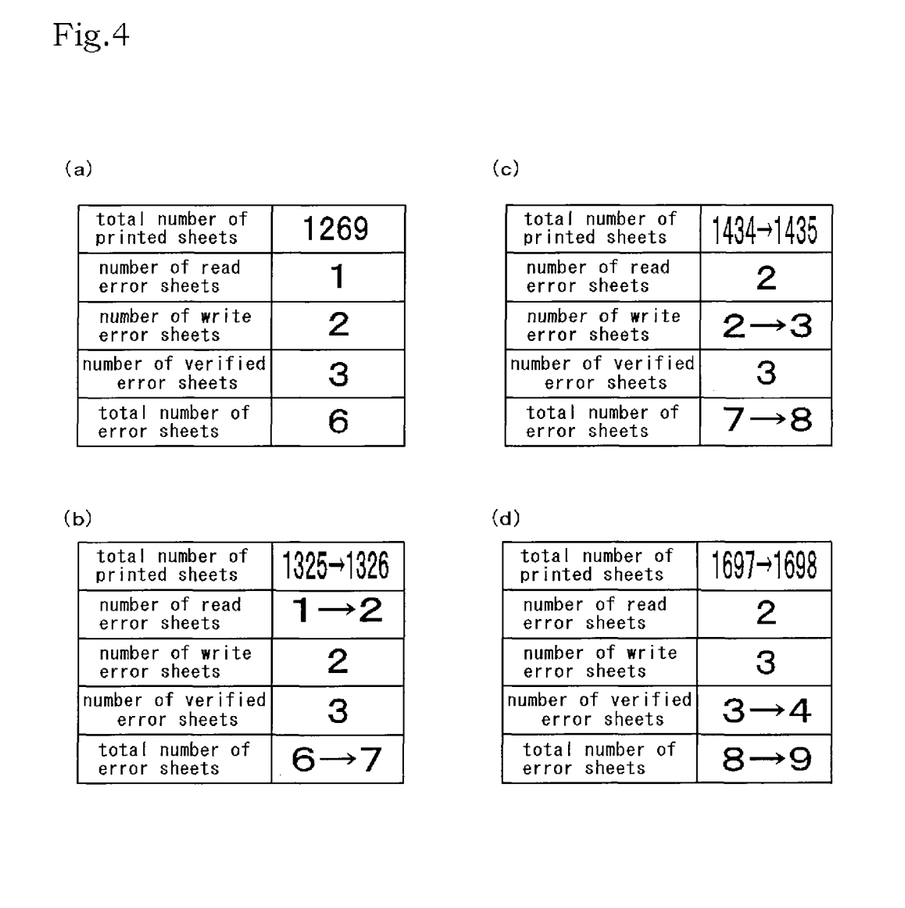

FIG. 1 shows a configuration of a printing device of an embodiment of the present invention. FIG. 2(*a*) is a schematic view showing a form of a continuous label strip used in the embodiment of the printing device of the present invention. FIG. 2(*b*) is a cross-section through a continuous label along the arrowed alternate long and short dash line A-A' in FIG. 2(*a*). FIG. 3 is a block diagram showing the configuration of the control unit in FIG. 1. FIG. 4 shows an example of the error information stored in the error information storage unit in FIG. 3.

Referring to FIG. 1, the printing device 100 of the present embodiment is provided with a platen roller 10, a thermal head 11 with heating element supported opposing the surface of the platen roller 10. The printing device 100 is configured to hold and convey a continuous label strip 1 between the platen roller 10 and the thermal head 11, so as to cause the heat-sensitive color forming layer surface side of the continuous label 1 to contact the heat element of the thermal head 11. By selectively generating a heating element of the thermal head 11 and color forming the heat-sensitive color-forming layer, the printing device 100 performs printing of the desired texts and barcodes, etc. In addition, the printing device 100 may be provided without a heat-sensitive color forming layer, and instead with a thermal transfer ribbon and a continuous label 1 held and conveyed between the platen roller 10 and the thermal head 11, thereby thermal transferring the ink of the thermal ribbon to the continuous label 1 to perform printing.

On the continuous label 1 used in the printing device 100, as shown in FIG. 2 (*a*), RFID labels 5 which are the RFID sheet are spaced at intervals and temporally attached to the strip form backing sheet 6. The continuous label strip 1 is loaded in the sheet supply unit 12 in a wound roll. On the RFID label 5, a RFID tag 4 comprised of an IC chip 2 and an antenna connected to the IC chip 2 are embedded. In general, the RFID tag 4, as shown in FIG. 2(*b*), is attached on a back surface of label base material 7 to configure the RFID label 5, as an inlet provided with an antenna 3 and an IC chip 2 on one or both sides of the film substrate, which substrate for example is polyethylene terephthalate (PET) films. Adhesive 8 is applied on the back surface of the label base material 7 on which the RFID tag 4 is attached. In addition, the RFID tag 4 is a unit which enables wireless (non-contact) communications by radio wave and is expressed by other names such as noncontact IC, non-contact IC, and IC tags, etc. However in the present invention, it will be described as RFID tag 4.

At the rear side of the continuous label strip 1, conveyed between the platen roller 10 and the thermal head 11 from the sheet supply unit 12, a label position detection sensor 13 is provided. The label position detection sensor 13 outputs a tally mark (a black rectangle mark) detection signal when a tally mark, formed by printing, etc. on the back surface of the continuous label 1, is detected. The tally mark detection signal is input to the control unit 30 from the label position detection sensor 13. The control unit 30 controls the thermal head 11 and a conveyance motor 14 that drives and rotates the platen roller 10 by the printing timing based on the detection signal of the tally mark. Then the control unit 30 prints the printing data from the host computer 40 on the display surface of the RFID label 5.

In addition, at the rear side of the continuous label 1 conveyed between the platen roller 10 and the thermal head 11 from the sheet supply unit 12, an antenna 151, which communicates with the RFID tag 4 embedded in the continuous label 1 (the RFID label 5), and connected to the reader/writer 15 which writes write data received from the host computer 40 to the RFID tag 4 is provided. The reader/writer 15 is a unit for writing information in the RFID tag 4. The process of writing the information is performed in the following procedure. When writing information on the RFID tag 4, first, a calling radio signal at a certain frequency is transmitted to the RFID tag 4 comprised of an IC chip 2 and an antenna 3. Then the stored information in the RFID tag 4 (the memory of the IC chip 2) is read by non-contacting. Next, the information is written on the IC tag 4 (the memory of the IC chip 2) by non-contacting, then the written information on the RFID tag 4 is verified. Also, the reader/writer 15 is configured to detect errors at a plurality of steps of information writing on the RFID tag 4. Specifically, the reader/writer 15 performs a read error detection which determines whether the specific ID stored on the RFID tag 4 was able to be read or not, a write error detection which determines whether the information was able to be written or not on the RFID tag 4 (the memory of the IC chip 2), and a verified error detection which, at verification of the information written in the RFID tag 4 (the memory of the IC ship 2), determines whether the information was able to be written correctly or not.

The RFID label 5, on which the printing data received from the host computer 40 is printed, and the write data received from the host computer 40 is written on the RFID tag 4, is cut-off at the strip form backing sheet 6 portion on the back end side of the label by a cutter 16 and is issued as a single sheet of RFID label 5. In addition, the cutter 16 may not be used, and the RFID label 5 may be issued temporarily attached to the strip form backing sheet 6.

A host computer 40 such as a personal computer is connected via an external interface (external I/F) 21 to the control unit 30. The control unit 30 makes it possible to send and receive all sorts of data and commands to and from the externally connected host computer 40. The control unit 30 receives the printing data printed on the RFID label 5, the write data, etc to be stored on the RFID tag 4 from the host computer 40.

The control unit 30, referring to FIG. 3, is provided with a ROM (read only memory) 31 in which a predetermined control program and font data are stored, and which stores each of the error type patterns at respective steps at which the errors have been detected by the reader/writer 15, a CPU (central processing unit) 32 which operates according to the control program stored in the ROM 31 and controls the other units, a RAM (random access memory) 33 which stores all sorts of data necessary for the CPU 32 to operate, a conveyance control unit 34 which sends a driving signal such as a pulse signal to the conveyance motor 14 and rotates the conveyance motor 14, a printing control unit 35 which makes the thermal head 11 to perform printing based on the instruction from the CPU 32, a label detection unit 36 which, under the control of the CPU 32, receives the tally mark detection signal from the label position detection sensor 13 and sends it to the CPU 32 as a pitch signal by converting it to a digital data, a cutter control unit 37 which drives the cutter 16 based on the instruction from the CPU 32, and an error information storage unit 38 in which the error information detected by the reader/writer 15 is stored.

The error information storage unit 38 is a storage means for storing the error information. The error information, referring to FIG. 4, consists of a total number of printed sheets which indicates the number of printings performed, a number of read error sheets which indicates the number of read errors detected, a number of write error sheets which indicates the number of write errors detected, a number of verified error sheets which indicates the number of verified errors detected, and a total number of error sheets which is the addition of the number of read error sheets, the number of write error sheets and the number of verified error sheets. Furthermore, the error information stored in the error information storage unit 38 is reset when a reset instruction is input from the operation unit of the printing device 100 or from an input unit 22 provided separately from the operation unit. In other words, the total number of printed sheets, the number of read error sheets, the number of write error sheets, the number of verified error sheets, and the total number of error sheets are reset to "0". In addition, the error information stored in the error information storage unit 38 is displayable by a not illustrated display unit such as a LDC, etc.

When the CPU 32 receives the write data and the printing data sent from the host computer 40 via the external I/F 21, the CPU 32 writes the received write data on the RFID tag 4 by the reader/writer 15. When the write data is written on the RFID tag 4 without any errors being detected, the CPU 32 reads out the font data corresponding to the character code which is included in the received printing data from the ROM 31, and then the CPU 32 develops a bitmap image data corresponding to the printing data sent from the host computer 40 on the drawing region of the RAM 33. If an error is detected by the reader/writer 15 and the write data was not possible to be written on the RFID tag 4, on the drawing region of the RAM 33, the CPU 32 develops a bitmap image data of the error type pattern corresponding to the step at which the error was detected by the reader/writer 15 and to the error information stored in the error information storage unit 38.

Next, the CPU 32 instructs to the printing control unit 35 to print the bitmap image data developed in the drawing region of the RAM 33, and also instructs the conveyance control unit 34 to convey the continuous label 1 in the conveyance direction.

The printing control unit 35, based on the instruction from the CPU 32 and corresponding to the bitmap image data developed in the drawing region of the RAM 33, provides a control signal to the thermal head 11 and performs the printing process. In addition, the conveyance control unit 34, based on the instruction from the CPU 32, sends a predetermined driving signal to the conveyance motor 14 and drives the motor 14. With this, either of the printing data or the error type pattern and the error information is printed on the continuous label 1 held and conveyed by the platen roller 10 and the thermal head 11.

Next, the printing operation of the RFID label 5 of the present embodiment will be described with reference to FIGS. 5 and 6.

Figure 5:
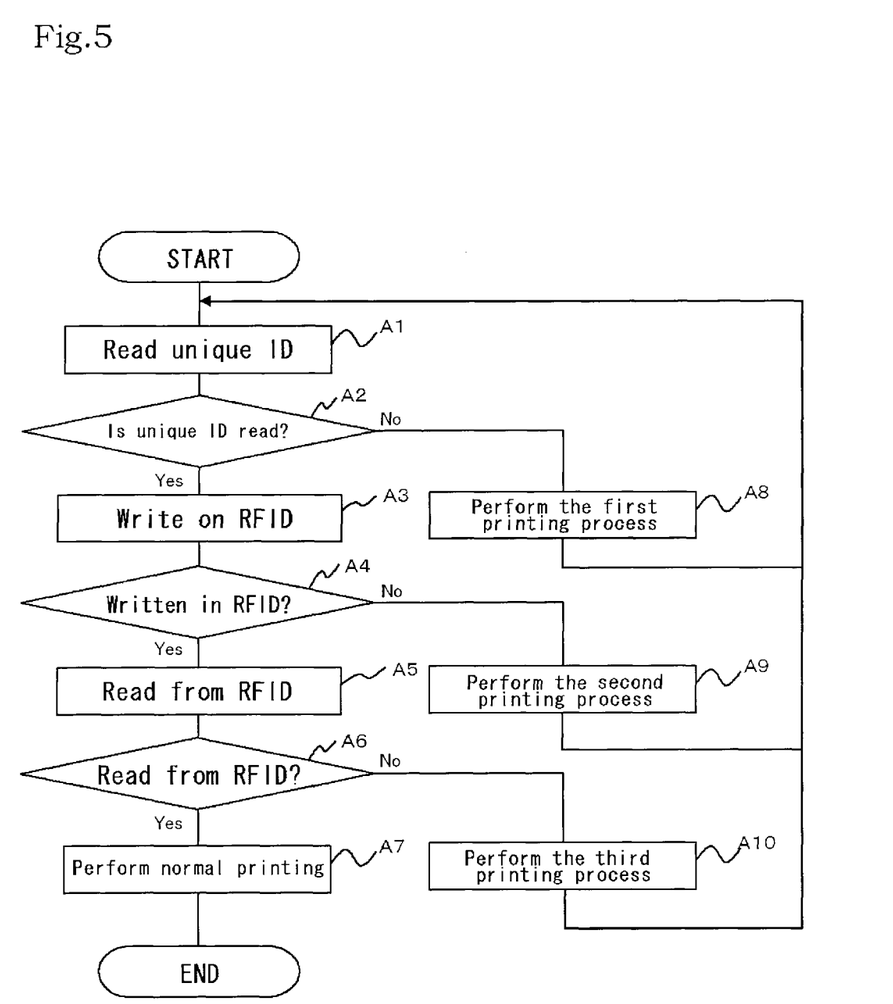
FIG. 5 is a flow chart explaining the RFID label issuance operation in the embodiment of the printing device of the present invention.
Figure 6:
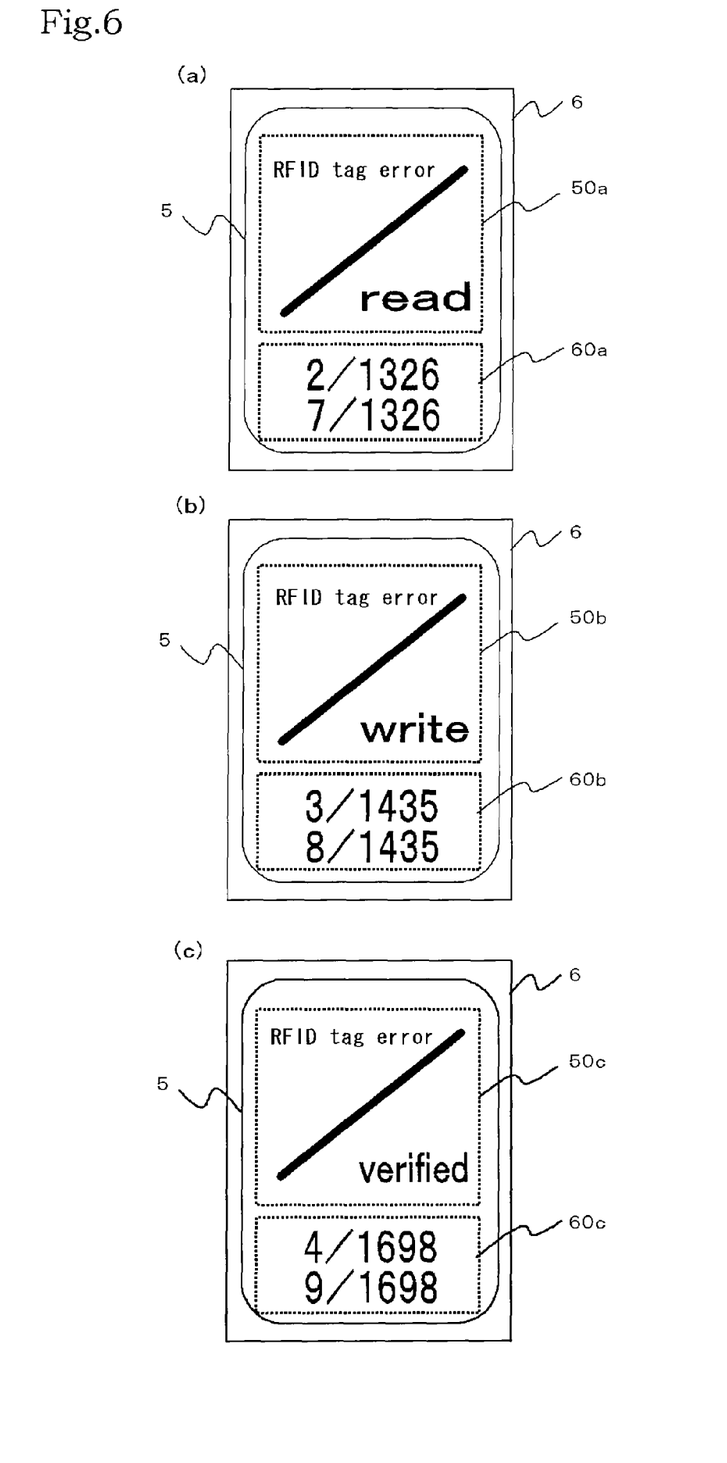

FIG. 5 is a flow chart explaining the operation of RFID label printing of the printing device related to the embodiment of the present invention. FIGS. 6(a) and 6(b) are diagrams showing examples of the RFID labels printed with error type pattern and error information related to the embodiment of the printing device of the present invention.

When the CPU 32 receives the write data and printing data sent from the host computer 40 via the external I/F 21, the CPU 32 performs the writing process of the write data on the RFID tag 4 of the RFID label 5 by the reader/writer 15.

In the writing process, first of all, reading of the unique ID (identification) stored in the RFID tag 4 is performed by the reader/writer 15 (Step A1). Next, a read error detection process which determines whether the unique ID was able to be read from the RFID tag 4 correctly or not is performed (Step A2). When the unique ID was able to be read correctly from the RFID tag 4, the reader/writer 15 writes the write data on the RFID tag 4 (Step A3). Next, a write error detection process which determines whether the write data was able to be written correctly or not on the RFID tag 4 is performed (Step A4). When the write data was able to be written correctly on the RFID tag 4, the reader/writer 15 reads the write data written on the RFID tag 4 (Step A5) and performs a verified error detection which determines whether the data written matches the data read or not, in other words, whether the write data was able to be written correctly or not on the RFID tag 4 (Step A6).

In case the write data and the read data in Step A6 matches, that is, if none of the read error, the write error or the verified error were detected and the write data was written correctly on the RFID tag 4, the reader/writer 15 notifies the CPU 32 that the writing had been performed normally. The CPU 32 increases by one the total number of printed sheets with regards to the error information stored in the error information storage unit 38, and also performs a normal printing process, that is, instructing the printing control unit 35 and the conveyance control unit 34 to print the printing data sent from the host computer 40. The CPU 32, thereby performing a normal printing process of printing the printing data on the RFID label 5, holding and conveying it between the platen roller 10 and the thermal head 11 (Step A7), and finishes the printing process.

In case the unique ID was not able to be read correctly from the RFID tag 4 in Step A2, that is, if a read error was detected by the reader/writer 15, the reader/writer 15 notifies the read error to the CPU 32. The CPU 32, as shown in FIG. 4(b), increases by one the total number of printed sheets, the number of read error sheets, and the total number of error sheets of the error information stored in the error information storage unit 38. The CPU 32 also reads from the ROM 31 the error type pattern indicating that the error type is a read error, and also each of the total number of the printed sheets, the number of read error sheets, and the total number of error sheets from the error information storage unit 38, then performs the first error printing process on the RFID label 5 (Step A8) and returns to Step A1 to perform the printing process to the next RFID label 5. FIG. 6(a) shows an example of the printing of the first error printing process on the RFID label 5, on which, the error type pattern 50a indicating that the error type is a read error, and the error information 60a indicating the total number of printed sheets, the number of read error sheets and the total number of error sheets are printed. Therefore, by the error type pattern 50a, it is possible to recognize that the error type is a read error, and also by the error information 60a, it is possible to recognize the frequency of the read error detected against the total number of printed sheets and the total number of error sheets.

In case the write data was not able to be written correctly on the RFID tag 4 in Step A4, that is, if the write error was detected by the reader/writer 15, the reader/writer 15 notifies the write error to the CPU 32. The CPU 32, as shown in FIG. 4(c), increases by one, the total number of printed sheets, the number of write error sheets, and the total number of error sheets of the error information stored in the error information storage unit 38. The CPU 32 also reads the error type pattern indicating that the error type is a write error from the ROM 31, and also each of the total number of printed sheets, the number of write error sheets, and the total number of error sheets from the error information storage unit 38, then performs the second error printing process on the RFID label 5 (Step A9) and returns to Step A1 to perform the printing process to the next RFID label 5. FIG. 6(b) shows an example of the printing of the second error printing process on the RFID label 5, on which, the error type pattern 50b indicating that the error type is a write error, and the error information 60b indicating the total number of printed sheets, the number of write error sheets and the total number of error sheets are printed. Therefore, by the error type pattern 50b it is possible to recognize that the error type is a write error, and also by the error information 60b, it is possible to recognize the frequency of the write error detected against the total number of printed sheets and the total number of error sheets.

In case the write data was not able to be read correctly from the RFID tag 4 in Step A6, that is, if a verified error was detected by the reader/writer 15, the reader/writer 15 notifies the verified error to the CPU 32. The CPU 32, as shown in FIG. 4(d), increases by one the total number of printed sheets, the number of verified error sheets, and the total number of error sheets of the error information stored in the error information storage unit 38. The CPU 32 also reads the error type pattern indicating that the error type is a verified error from the ROM 31, and also each of the total number of printed sheets, the number of verified error sheets, and the total number of error sheets from the error information storage unit 38, then performs the third error printing process on the RFID label 5 (Step A10) and returns to Step A1 to perform the printing process to the next RFID label 5. FIG. 6(c) shows an example of the printing of the third error printing process on the RFID label 5, on which, the error type pattern 50c indicating the error type is a verified error, and the error information 60c indicating the total number of printed sheets, the number of verified error sheets and the total number of error sheets are printed. Therefore, by the error type pattern 50c it is possible to recognize that the error type is a verified error, and also by the error information 60c, it is possible to recognize the frequency of the verified error detected against the total number of printed sheets and the total number of error sheets.

As described above, according to the present embodiment, the printing device 100 writes information on the RFID tag 4, and is provided with a reader/writer 15 which detects errors at plural steps of information writing process to the RFID tag 4, and a ROM 31 which stores each error type patterns 50a, 50b and 50c for the respective steps at which the error are detected by the reader/writer 15. The control unit 30 is configured such that when an error is detected by the reader/writer 15, it reads the error type patterns 50a, 50b and 50c corresponding to the step at which the error was detected from the ROM 31, and prints the one read on the RFID label 5. Thereby, on the RFID label 5 of which the RFID tag 4 is unusable, the error type pattern 50a, 50b or 50c corresponding to the step at which the error was detected by the reader/writer 15 is printed. Therefore, it is possible to easily understand the type of the error caused, that is, at which step the error had occurred, saving the time and effort for finding out the cause of the error.

Furthermore, according to the present embodiment, by providing an error information storage unit 38 which stores the number of error sheets increased by one for each step, each time an error is detected by the reader/writer 15, and by referring to the number of error sheets stored in the error information storage unit 38, it is possible to easily understand the number of error sheets which occurred at respective steps, saving the time and effort for finding out the cause of the error.

Still furthermore, according to the present embodiment, the control unit 30 is configured such that, when an error is detected by the reader/writer 15, it prints the number of error sheets corresponding to the step at which the error was detected on the RFID label 5. Therefore, it is possible to easily understand the number of errors that occurred at each step simply by looking at the issued RFID label 5, saving the time and effort for finding out the cause of the error.

Furthermore, according to the present embodiment, the printing device 100 stores in the error information storage unit 38 the total number of printed sheets increased by one every time printing is performed on the RFID label 5. When an error is detected by the reader/writer 15, the control unit 30 is configured to print the total number of printed sheets on the RFID sheet. Based on the total number of sheets printed and the total number of error sheets printed on the RFID label 5, it is possible to easily understand the frequency of the error occurrence against the total number of sheets printed, saving the time and effort for finding out the cause of the error.

Still furthermore, according to the present embodiment, the printing device 100 is provided with an input unit 22 which resets the error information stored in the error information storage unit 38. Therefore, by resetting the error information stored in the error information storage unit 38 for each label type and for each production lot of the loaded RFID label 5, it is possible to easily understand the error frequency by each label type and by each production lot of the RFID label 5, saving the time and effort for finding out the cause of the error.

While in the present embodiment, the error is detected by the reader/writer 15, it is not limited to this, but the error may be detected by the CPU 32. In addition, all of the total number of printed sheets, the read errors, the write errors, the verified errors, and the total number of errors stored in the error information storage unit 38 may all be printed.

While preferred embodiments of the invention have been described and illustrated above, it should be understood that these are not to be considered as limiting and is apparent that appropriate modification may be made within the scope of technological thoughts of the present invention. The above embodiment is not to be considered as being limited by the foregoing quantity, positions, forms, etc. of the configuration members, but it may be modified with preferable quantity, positions, forms, etc. In addition, the same reference numbers are used for the same configuration elements in each figure.

REFERENCE SIGNS LIST 1 continuous label
2 IC ship
3 antenna
4 RFID tag
5 RFID label (RFID sheet)
6 strip form backing sheet
7 label base material
8 adhesive
10 platen roller
11 thermal head
12 sheet supply unit
13 label position detection sensor
14 conveyance motor
15 reader/writer (information write unit, error detection unit)
16 cutter
21 external interface (external I/F)
22 input unit
30 control unit (printing control unit)
31 ROM
32 CPU
33 RAM
34 conveyance control unit
35 printing control unit
36 label detection unit
37 cutter control unit
38 error information storage unit
40 host computer
50a, 50b, 50c error type pattern
60a, 60b, 60c error information
100 printing device
151 antenna

The invention claimed is:

1. A printing device which writes information into and prints on a RFID sheet having a RFID tag, the printing device comprising:

an information writing unit configured for writing information into the RFID tag in a plurality of steps;
an error detection unit configured for detecting errors at the plurality of steps in a procedure for writing information into the RFID tag by the information writing unit;
an error type pattern storage unit configured for storing each detected error type patterns at respective steps at which the errors have been detected by the error detection unit;
a printing control unit configured for reading from the error type pattern storage unit, the error type patterns corresponding to a step at which the error has been detected when an error is detected by the error detection unit, and configured for printing the error type pattern on the RFID sheet; and
an error information storage unit configured for storing as an error information a number of error sheets which number is increased by one each time an error is detected by the error detection unit for the respective steps as an error information.

2. The printing device according to claim 1, wherein when an error is detected by the error detection unit, the printing control unit is configured for printing the number of error sheets corresponding to the step at which the error was detected on the RFID sheet.

3. The printing device according to claim 2, wherein the printing device is configured for storing, together with the number of error sheets, the total number of printed sheets increased by one each time printing is performed on the RFID sheet as the error information in the error information storage unit, and wherein
the printing control unit is configured for printing the total number of printed sheets on the RFID sheet when an error is detected by the error detection unit.

4. The printing device according to claim 1, further comprising an input unit which resets the error information stored in the error information storage unit.

5. The printing device according to claim 2, further comprising an input unit which resets the error information stored in the error information storage unit.

6. The printing device according to claim 3, further comprising an input unit which resets the error information stored in the error information storage unit.

7. A method of printing information on one or more RFID tags in an arrangement of RFID tags, wherein each of the RFID tags in the arrangement has a respective tag information storage for storing information supplied to the tag information storage, the information including a unique identification of each of the RFID tags, the method comprising:

reading data on one of the RFID tags, the data including the unique identification stored in the one RFID tag;
performing a first error detection process to determine whether the unique identification has been read correctly from the one RFID tag, if the unique identification has been read correctly from the one RFID tag, performing a first writing of respective write data on the one RFID tag;
performing a second write error detection process to determine whether the write data was correctly written on the RFID tag;
performing a third verified error detection process to determine whether the write data written on the one RFID tag can be read correctly to match data that have been read to determine whether the write data was written correctly or not on the RFID tag;
if none of a read error, a write error, or a verified error was detected in performing the first, second and third error detection processes because the write data was written correctly on the RFID tag, sending a central processing unit (CPU) notice that the write data had been written normally, the CPU causing performance of a normal printing process of printing information on the at least one RFID tag and the RFID arrangement;

if one of the first, second or third error detection processes respectively determines there has been an error in reading the unique identification from the one RFID tag, or determines that the write data was written correctly to the one RFID tag, or determines that data written to the one RFID tag does not match the data read and cannot determine whether the write data had been written correctly or not, then performing a respective error recording process for the one RFID tag.

8. The method of claim 7, wherein if a read error was detected in the first error detection process, notifying the CPU of a read error,
- on the CPU, increasing by one the total number of printed arrangements of RFID tags, the number of arrangements of RFID tags with read errors, and the total number of arrangements of RFID tags having read error information in an error information storage;
- the CPU receiving information concerning the error type pattern, indicating that the error type is a read error; and
- the CPU then causes performing of a first error printing process on the arrangement of RFID tags.

9. The method of claim 7, wherein if a write error was detected in the second error detection process as not having been written correctly on the RFID tag, notifying the CPU of a write error;
- on the CPU, increasing by one the total number of printed arrangements of RFID tags, the number of arrangements of RFID tags with write errors, and the total number of arrangements of RFID tags having error information stored in an error information storage;
- the CPU receiving information concerning the error type pattern, indicating that the error type is a write error; and
- the CPU then causes performing of a second error printing process on the arrangement of RFID tags.

10. The method of claim 7, wherein if a verified error in the write data read on the RFID tag was detected in the third error detection process, notifying the CPU of a verified write error;
- on the CPU, increasing by one the total number of printed arrangements of RFID tags, the number of arrangements of the RFID tags with verified write errors, and the total number of RFID tags having error information stored in an error information storage;
- the CPU receiving information concerning the error type pattern indicating that the error type is a verified reading error; and
- the CPU then causes performing of a third error printing process on the arrangement of RFID tags.

11. The method of claim 7,
wherein if a read error was detected in the first error detection process, notifying the CPU of a read error,
- on the CPU, increasing by one the total number of printed arrangements of RFID tags, the number of arrangements of RFID tags with read errors, and the total number of arrangements of RFID tags having read error information in an error information storage;
- the CPU receiving information concerning the error type pattern, indicating that the error type is a read error; and
- the CPU then causes performing of a first error printing process on the arrangement of RFID tags; and wherein if a write error was detected in the second error detection process as not having been written correctly on the RFID tag, notifying the CPU of a write error;
- on the CPU, increasing by one the total number of printed arrangements of RFID tags, the number of arrangements of RFID tags with write errors, and the total number of arrangements of RFID tags having error information stored in an error information storage;
- the CPU receiving information concerning the error type pattern, indicating that the error type is a write error; and
- the CPU then causes performing of a second error printing process on the arrangement of RFID tags; and wherein if a verified error in the write data read on the RFID tag was detected in the third error detection process, notifying the CPU of a verified write error;
on the CPU, increasing by one the total number of printed arrangements of RFID tags, the number of arrangements of the RFID tags with verified write errors, and the total number of RFID tags having error information stored in an error information storage;
the CPU receiving information concerning the error type pattern indicating that the error type is a verified reading error; and
the CPU then causes performing of a third error printing process on the arrangement of RFID tags.

12. The method of claim 7, wherein each RFID tag arrangement comprises a sheet on which a plurality of individual RFID tags are supported during performance of the method.

13. The method of claim 7, wherein a reader/writer performs each of the reading, writing and error detection processes and transmits detected information to and receives information for performing the steps in the processes from the CPU and from the information storage and from a memory of the error patterns.

* * * * *